(No Model.)
E. KASELOWSKY.
VALVE FOR MOTORS.
No. 374,073. Patented Nov. 29, 1887.
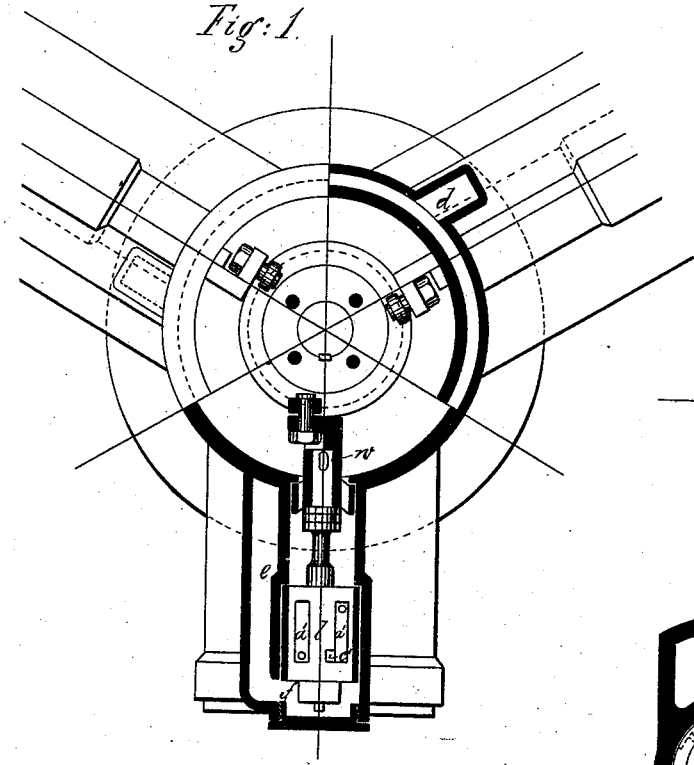
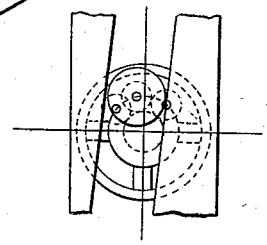
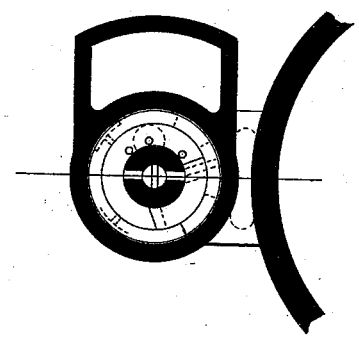
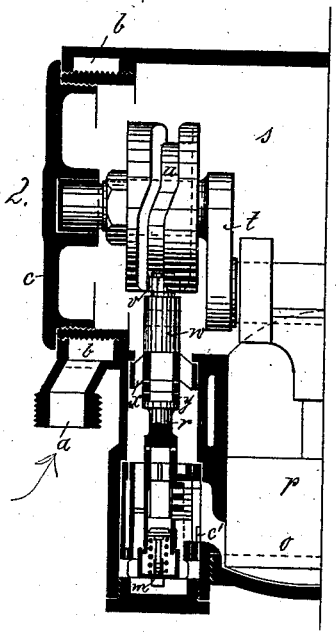
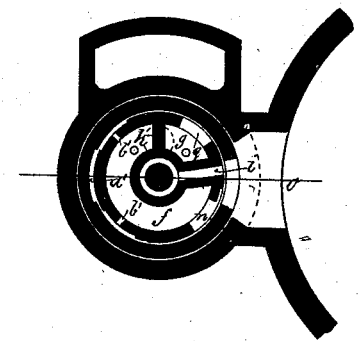
Witnesses.
Anthony Steffen
Wilhelm Vogt
Inventor.
Emil Kaselowsky
By his Attorney
Edwin A. Bridges

UNITED STATES PATENT OFFICE.

EMIL KASELOWSKY, OF BERLIN, GERMANY.

VALVE FOR MOTORS.

SPECIFICATION forming part of Letters Patent No. 374,073, dated November 29, 1887.

Application filed December 7, 1885. Serial No. 184,907. (No model.) Patented in Germany August 23, 1885, No. 34,869; in France October 14, 1885, No. 171,666; in Belgium October 17, 1885, No. 70,534; in Italy October 28, 1885; in England November 9, 1885, No. 13,585, and in Austria-Hungary April 16, 1886, No. 41,842 and No. 15,868.

*To all whom it may concern:*

Be it known that I, EMIL KASELOWSKY, of the city of Berlin, in the kingdom of Prussia and German Empire, have invented certain new and useful Improvements in Valves for Motors with One or More Cylinders, (for which a patent has been granted in the following countries: in Germany August 23, 1885, No. 34,869; in Austria-Hungary April 16, 1886, No. 41,842 and No. 15,868; in France October 14, 1885, No. 171,666; in Belgium October 17, 1885, No. 70,534; in England November 9, 1885, No. 13,585, and in Italy October 28, 1885,) of which the following is a specification.

My invention relates to improvements in motors with one or more cylinders.

The object of my said invention of improvements in motors with one or more cylinders is to avoid the dangerous spaces which are found in motors with rotary distributing slides or valves constructed after the system of the well-known Brotherhood three-cylinder machines, and to avoid the loss of power caused by the friction of such said slides when in operation.

In contradistinction to the distributing-regulator for machines with several cylinders, invented by Whitehead, in Fiume, the object of the present invention is to obviate the considerable pressure on the excenter on the rollers of the slide-rod and on the axle of such said machines, which are mostly run at high speed and under high steam-pressure, and which said parts are subjected to great wear and tear, by employing a bearing admitting very little friction and next to no loss of power.

The object of the present invention is, further, to obviate the unfavorably-operating friction of the eccentric-strap under the pressure of the differential distributing valve or slide, which said eccentric-strap forms a part of the slide-rod and causes the reciprocating motion of the distributing valve or slide in the Brotherhood construction.

My improved oscillating cylindrical slide or piston is so arranged that it simultaneously serves to regulate the outlet for steam, gas, or air, whereas a separate slide has to be arranged in the piston of the Brotherhood machine for this purpose.

My improved distributing-regulator consists of an oscillating cylindrical slide-valve, the exterior surface of which is fully freed from pressure, and which is arranged in the cylindrical casing of the distributing-regulator. The pressure of steam, gas, or air which operates on the end surface of the cylindrical slide-valve is taken up by a suitable bearing located at the opposite end of the said cylindrical slide-valve or by the slide-rod. The friction of the collar of the cylindrical valve against the bearing is reduced to a minimum by means of anti-friction washers or disks of different anti-friction metals. A sleeve or muff is arranged on the protruding end of the slide-rod and eccentrically to the axis of the same. This said sleeve or muff carries an anti-friction roller, which is arranged on a pivot attached to the said sleeve or muff, and which hangs free in the cam-groove of a disk attached to the one end of the crank-shaft in the cover of the machine.

The distributing-regulator slide-valve consists of a cylinder with interior ribs, which divide or separate the hollow space in the direction of the longitudinal axis of the cylindrical slide-valve into two compartments, one of which is in connection with the exhaust-space and the other with the filling-space or steam, gas, or air inlet, and is further provided with a safety-valve, which at the same time acts as an outlet-valve, and when opened forms a communication with the exhaust when the pressure in the driving-cylinder is greater than or in excess of the supply. The object of the said safety-valve is, further, to automatically let off any water of condensation that may collect in the apparatus into the exhaust by means of small canals arranged for such said purpose.

The freeing of the slide-valve from pressure is accomplished by the recessed canals in the surface of the said slide-valve and the cylindrical casing arranged exactly opposite to the inlet and outlet canals, which said recessed canals are connected by suitable borings with the inlet and outlet openings, so that the pressure is fully equalized.

The machine can, by means of a small canal, be started in any position of the crank, and, for instance, even in the position in a three-cylinder machine, where the distributing slide-valves of two of the cylinders are closed and the crank of the third machine is at its dead-point, as hereby so much steam, gas, or air will pass through the small canal into the two first cylinders that the main crank will be caused to move slowly until the slide-valves are opened and the full steam-pressure comes into action.

It will be evident from the foregoing that very little power is requisite for operating the parts, in consequence of the surfaces being freed from pressure and the pressure on the end of the cylindrical slide-valve being taken up by the bearing to the same.

Figure 1 is a vertical section with partial elevation of the oscillating cylindrical slide-valve. Fig. 2 is a longitudinal section of the same. Fig. 3 is a representation of the lower part of the cam-groove and the movement of the guide-roller in the same. Fig. 4 is a section on the line A B in Figs. 1 and 2; Fig. 5, a section on the line C D in the same figures.

The distributing-regulator is provided with an oscillating cylindrical slide-valve, $l$, the surface of which is entirely freed from pressure. The steam, gas, or air pressure exercised on the head of the same during the working of the machine is received by the bearing $x$, the friction of the collar of the slide-rod against the bearing being taken up by loose frictional disks or washers $y$, placed between the said collar and the bearing, consisting of different anti-friction metals. A sleeve or muff, $w$, is fixed to the end of the slide-rod protruding beyond the end of the bearing $x$, and carries a pivot and a friction-roller, $v$, arranged eccentrically to the axis of the slide or slide-rod. This friction-roller $v$ hangs free in a curvilinear or cam groove in the cam or disk $u$, which is affixed to that part of the crank-shaft which has its bearings in $c$.

The slide-valve consists of a cylinder provided interiorly with a suitable rib or partition, which divides the hollow space into two parts, of which the one $f$ is in connection with the exhaust while the other, $g$, is in connection with the supply. The slide-valve is further provided with a safety-valve, $m$, which simultaneously acts as outlet-valve, and which opens and forms a connection with the exhaust-space when the compression in the working-cylinder is higher than the admission-pressure. The valve is, further, so constructed that, as is specially desirable for torpedo-actuating machines, any water of condensation which may accumulate is allowed to automatically pass off through small canals into the exhaust.

The slide-valve $l$ is freed from pressure by means of the recessed canals $a'\ a'$, arranged opposite the inlet and outlet canals and of like size with the same, which are formed in the slide-valve and in the casing to the same, and which are in connection with the inlets and outlets by means of the borings $b'\ b'$.

The small canal $c'$ in the cylindrical slide-valve enables me to start the machine regardless of the position of the crank.

It is evident from the foregoing specification that by freeing the surface of the slide-valve from pressure, and the pressure on the end surface being taken up by the bearing $x$, very little power is necessary to produce the oscillating motion of the said slide-valve, and consequently the wear and tear of the actuating parts must be minimum.

My said construction can be employed for machines with one or more cylinders, for single-cylinder, or for compound machines, and can be employed in machines driven by steam, air, or gas.

The operation of my improved distributing-regulator is as follows: Steam, gas, or air enters at the inlet $a$, circulates through the annular canal $b$ in the cover $c$ of the machine, and passes through the connecting-canal $d$ into the lateral canal $e$ of each slide-valve casing $k$, passes from thence into the same, and fills the space $f$ of the slide-valve $l$, which is in connection with the steam, gas, or air chamber. The oscillating slide-valve $l$ is further provided with a second space or chamber, $g$, which is in connection with the exhaust-chamber, and is separated from the space $f$ by means of the two ribs or partitions $h$ and $i$, the latter of which is provided with a canal leading to the valve $m$. These two ribs or partitions $h\ i$ run in spiral or curvilinear form in the hollow interior of the slide-valve $l$. When the space or chamber $f$ communicates through the boring or opening $n$ with the cylinder $o$, steam will be admitted and the piston $p$ driven forward; but if the space $g$ communicates through the opening $q$ with the cylinder the expanded steam will pass upward through the hollow slide-valve and escape along the slide-rod $r$ into the space or chamber $s$, which contains the main crank or crank-shaft $t$, from which said chamber the steam, gas, or air is allowed to pass off.

The crank-shaft $t$ has its bearing in the cover of the machine, and carries a disk cam or drum with a cam or curvilinear groove, $u$, which serves as guide-track for the anti-friction roller $v$, which is arranged eccentrically to the axis of the slide-rod $r$ on a suitable sleeve or muff, $w$, fixed to the slide-rod $r$, which latter has its bearing at $x$ in the slide-valve casing.

In order to avoid all friction on the bearing, I employ a number of anti-friction rings on the said slide-rod $r$.

It will be evident from the foregoing that a rotation of the cam-disk will cause the slide-valve $l$ to make an oscillating movement and thus bring the chambers $f$ and $g$ in alternate communication with the cylinder $o$, so that steam, gas, or air is admitted into the same and is allowed to expand and to escape from the same.

Any water of condensation which may be formed is conducted off through the valve $m$ to the chamber or space $g$, and is carried with the exhaust-steam into the space $s$.

In order to free the slide-valve from pressure, I form recesses or recessed canals $a'$ in the outer periphery of the slide-valve and the inner periphery of the slide-valve casing of like size with and exactly opposite to the inlet and outlet openings and communicating through the borings $b'$ with the said inlets and outlets.

In the casing to the slide-valve I also arrange a small canal, $c'$, which, even when the slide-valve is closed, still communicates with the cylinder, so that if two or three slide-valves are closed and the crank of the third is at its dead-point the machine can still be started.

Having now particularly described and ascertained the nature of my said invention, what I claim is—

1. In combination, an oscillating cylindrical slide-valve, $l$, having a rod, $r$, and muff $w$, carrying an anti-friction roller, $v$, said slide-valve working in a cylindrical casing and provided with an interior hollow space registering with the exhaust and inlet ports, substantially as described.

2. A slide-valve, $l$, having the recessed canals in its surface and having a rod, $r$, and mechanism, substantially as described, connected therewith for giving it rotary oscillation, in combination with the recessed canals in the casing, arranged approximately opposite to the canals in the slide-valve and connected by suitable borings with the inlet and outlet openings in the casing, whereby the pressure is equalized, substantially as described.

3. The rotary valve $l$, divided into hollow spaces in the direction of its length, in combination with the inlet and exhaust passages and means for giving the valve rotary oscillation, and with the safety spring-valve $m$, located in the lower end of the valve $l$, substantially as described.

4. In combination, the slide-valve $l$, provided with interior longitudinal divisions, recessed canals, and the canal $c$, with the cylindrical casing having a corresponding recessed canal and with exhaust and supply passages, all as set forth.

In witness whereof I have hereunto signed my name in the presence of two subscribing witnesses.

EMIL KASELOWSKY.

Witnesses:
   EDWIN A. BRYDGES,
   B. ROI.